United States Patent
Siciak et al.

(10) Patent No.: US 9,755,417 B2
(45) Date of Patent: Sep. 5, 2017

(54) HIGH VOLTAGE CUTOFF FOR ELECTRIFIED VEHICLES

(71) Applicant: Ford Global Technologies, LLC, Dearborn, MI (US)

(72) Inventors: Ray C. Siciak, Ann Arbor, MI (US); David Crist Gabriel, Royal Oak, MI (US); Bo Wu, Northville, MI (US); Derek Hartl, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 643 days.

(21) Appl. No.: 14/201,396

(22) Filed: Mar. 7, 2014

(65) Prior Publication Data

US 2015/0255975 A1    Sep. 10, 2015

(51) Int. Cl.
*H02H 3/05*    (2006.01)
*B60R 16/02*    (2006.01)
(Continued)

(52) U.S. Cl.
CPC ............. *H02H 3/05* (2013.01); *B60L 3/0023* (2013.01); *B60L 3/04* (2013.01); *B60L 11/1816* (2013.01); *B60L 11/1864* (2013.01); *B60L 11/1868* (2013.01); *B60R 16/02* (2013.01); *H02J 7/0031* (2013.01); *B60L 2240/12* (2013.01); *B60L 2240/36* (2013.01); *B60L 2240/421* (2013.01); *B60L 2240/441* (2013.01);
(Continued)

(58) Field of Classification Search
CPC ....................................................... H02H 3/05
USPC .......................................................... 307/9.1
See application file for complete search history.

(56) References Cited

U.S. PATENT DOCUMENTS

2002/0167223 A1* 11/2002 Yamazaki ........... B60L 11/1851
                                                                    307/9.1
2012/0002338 A1    1/2012 Smith et al.
(Continued)

FOREIGN PATENT DOCUMENTS

JP          2004007919 A  *  1/2004
WO    WO 2011067132 A1    6/2011

OTHER PUBLICATIONS

Side impact: Front and center; Author: Automotive Industries AI; Publication date: Sep. 2004; http://www.engineeringvillage2.org/controller/servlet/Controller?SEARCHID=14b9a7412b3ad534cdM6176prod2data1&CID=expertSearchAbstractFormat&DOCINDEX=2&database=1&format=expertSearchAbstractFormat.

*Primary Examiner* — Joseph Chang
(74) *Attorney, Agent, or Firm* — James P. Muraff; Neal, Gerber & Eisenberg LLP

(57) ABSTRACT

Systems and methods provide an alternative high voltage cutoff technique for disconnecting a high voltage battery from an electrical network of a vehicle in the event of a fault condition. Embodiments include a vehicle system comprising an electrical bus and a battery module coupled to the electrical bus via a contactor and a disconnector. The vehicle system further includes a controller configured to switch the contactor to an open state, upon receiving a fault condition signal, and if the contactor failed to open, activating the disconnector to break electrical connection between the battery module and the electrical bus. In some embodiments, the fault condition signal is generated upon detecting a vehicular impact. In some embodiments, the disconnector is a pyrotechnic device powered by a vehicle battery included in the vehicle system.

20 Claims, 4 Drawing Sheets

(51) Int. Cl.

| | | |
|---|---|---|
| *H02J 7/00* | (2006.01) | |
| *B60L 3/00* | (2006.01) | |
| *B60L 3/04* | (2006.01) | |
| *B60L 11/18* | (2006.01) | |
| *H02H 3/087* | (2006.01) | |
| *H02H 3/16* | (2006.01) | |
| *H02H 3/24* | (2006.01) | |
| *H02H 9/00* | (2006.01) | |

(52) U.S. Cl.
CPC ........ *B60L 2240/461* (2013.01); *H02H 3/087* (2013.01); *H02H 3/16* (2013.01); *H02H 3/243* (2013.01); *H02H 9/001* (2013.01); *Y02T 10/642* (2013.01); *Y02T 10/7005* (2013.01); *Y02T 10/7061* (2013.01); *Y02T 10/7066* (2013.01); *Y02T 10/7072* (2013.01); *Y02T 90/14* (2013.01)

(56) References Cited

U.S. PATENT DOCUMENTS

| | | |
|---|---|---|
| 2012/0058382 A1 | 3/2012 | Carignan et al. |
| 2012/0106017 A1 | 5/2012 | Schumacher et al. |

\* cited by examiner

HIGH VOLTAGE CUTOFF FOR ELECTRIFIED VEHICLES

TECHNICAL FIELD

This application generally relates to electric and/or hybrid vehicles and more specifically, to providing high voltage cutoff during a vehicular impact.

BACKGROUND

Battery packs for electric and/or hybrid vehicles typically include one or more high voltage batteries to provide the energy required by the drive systems of such vehicles. Such high voltage batteries typically provide voltages of above 100 volts (V), for example, up to 400 V. Some battery packs include a high voltage cutoff system comprising a high voltage contactor for disconnecting the high voltage battery in certain circumstances. A high voltage contactor is an electrically controlled switch capable of switching a high power circuit, such as, for example, a circuit operating at more than 15 amperes (A). However, this single contactor system has some drawbacks. For example, certain fault conditions, such as a high voltage short-circuit, can cause the contactor to weld to metal portions of the battery circuit. Specifically, the fault condition can cause an electrical arc to form across the contactor, causing metal portions of the contactor to heat to a very high temperature (e.g., high enough to form a plasma). If the heated portions of the contactor come into contact with each other, and remain in contact while cooling down, the contactor portions bond together to create a solid connection across the contactor and therefore, between the high voltage battery and the battery circuit.

In view of this, some automotive manufacturers have implemented a dual-contactor system comprising a redundant second contactor that is intended to disconnect the high voltage battery in the event of a welded first contactor. As an example, FIG. 1 depicts a conventional dual-contactor system 100 found in some commercially-available electric and/or hybrid vehicles. The dual-contactor system 100 includes a battery module 102 coupled to a vehicle bus 104 (also referred to as a high voltage bus) via two leads, DCL+ and DCL-. The battery module 102 includes a high voltage battery 106 with two leads MC+ and MC-, and two contactors 108 and 110. The contactor 108 selectively couples the MC+ lead to the DCL+ lead, while the contactor 110 selectively couples the MC- lead to the DCL- lead. During normal operation of the vehicle (e.g., while the vehicle is being driven), the contactors 108 and 110 are in a closed position, so that the high voltage battery 106 is electrically coupled to the vehicle bus 104. In the event of a vehicular impact or other fault condition, the contactors 108 and 110 are switched open in order to disconnect the high voltage battery 106 from the vehicle bus 104.

As shown in FIG. 1, the dual-contactor system 100 can also be used in Plug-in Hybrid Electric Vehicles (PHEV) and Battery Electric Vehicles (BEV) where a vehicle charger 112 can supply power to the vehicle bus 104. In such cases, the battery module 102 includes contactors 109 and 111 for selectively coupling the vehicle charger 112 to the DCL+ and DCL- leads, respectively, and disconnecting the vehicle charger 112 from the vehicle bus 104 upon impact.

Further, as shown in FIG. 1, the battery module 102 can include a precharge circuit 113 that can also include a contactor 115. The battery module 102 may have a specific contactor closing sequence in order to eliminate the potential for arcing when turning on the vehicle. For example, in the battery module 102, the contactor 108, which is coupled to the positive lead MC+ of the high voltage battery 106, may be closed first, then the precharge contactor 115 may be closed, and lastly, the contactor 110, which is coupled to the negative lead MC- of the high voltage battery 106, may be closed. Once the vehicle is turned on, the precharge contactor 115 may be switched open, but the other two contactors 108, 110 may remain closed while the vehicle is being driven. As a result, when an accident or collision occurs, the precharge contactor 115 is already in an opened state and therefore, may not be affected by the above-described potential for arcing and welding.

SUMMARY

This application is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

Example embodiments provide systems and methods for an alternative high voltage cutoff technique that disconnects a high voltage battery from an electrical network of a vehicle in the event of a fault condition. According to some embodiments, a vehicle system comprises an electrical bus and a battery module coupled to the electrical bus via a contactor and a disconnector. The vehicle system further includes a controller configured to switch the contactor to an open state, upon receiving a fault condition signal, and if the contactor failed to open, activating the disconnector to break electrical connection between the battery module and the electrical bus. In one exemplary embodiment, the disconnector is a pyrotechnic device powered by a vehicle battery included in the vehicle system. In one exemplary embodiment, the fault condition signal is generated upon detecting a vehicular impact.

According to some embodiments, a method for disconnecting a battery module from an electrical bus in a vehicle is provided. The method includes attempting to open a contactor between the battery module and the electrical bus when the vehicle is in a fault condition. The method further includes if the contactor does not open, activating a disconnector to break electrical connection between the battery module and the electrical bus. According to one exemplary embodiment, the fault condition is a vehicular impact. In one exemplary embodiment, the disconnector is a pyrotechnic device powered by a vehicle battery included in the vehicle system.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
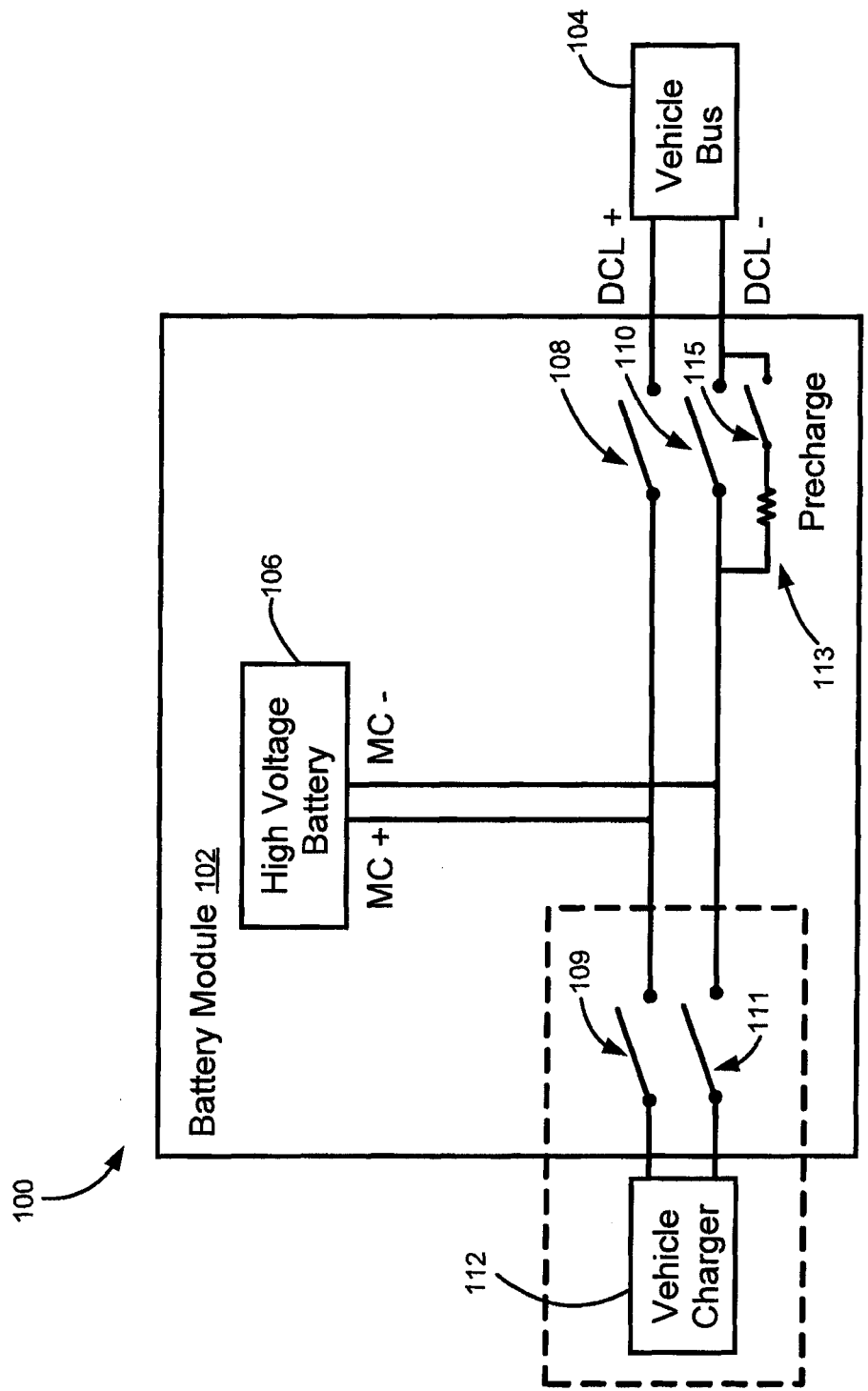
FIG. 1 depicts a prior art dual-contactor system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

This application is intended to provide an alternative high voltage cutoff system by providing systems and methods that use a two-step voltage cutoff technique to disconnect a high voltage battery from an electrical network of a vehicle in the event of a fault condition. Specifically, example embodiments provide a power circuit (also referred to herein as a "battery module") that electrically connects a high voltage battery to an electrical bus using a selectively operable contactor to form a first connection line and a selectively operable disconnecting device—other than a contactor—on a second connection line. During normal operation (e.g., while the vehicle is being driven), both the contactor and the disconnecting device can be in a "closed state," so as to form the first and second electrical connections, respectively, between the high voltage battery and the electrical bus. Upon detecting a fault condition, a control module can direct the contactor to open in order to break the first connection and interrupt the flow of high voltage into the electrical bus. The control module can then verify whether the contactor has in fact opened. If this verification fails (e.g., the contactor failed to open or is welded into the closed state), the control module can activate the disconnecting device to break the second connection. In some embodiments, the disconnecting device is a pyrotechnic device that, upon activation or detonation, can irrevocably destroy the second connection between the high voltage battery and the electrical bus, thereby eliminating the possibility of an unintended reconnection. As a result, the disconnecting device can provide a reliable, back-up disconnection option in the event that the primary contactor fails to disconnect the high voltage battery.

Figure 2:
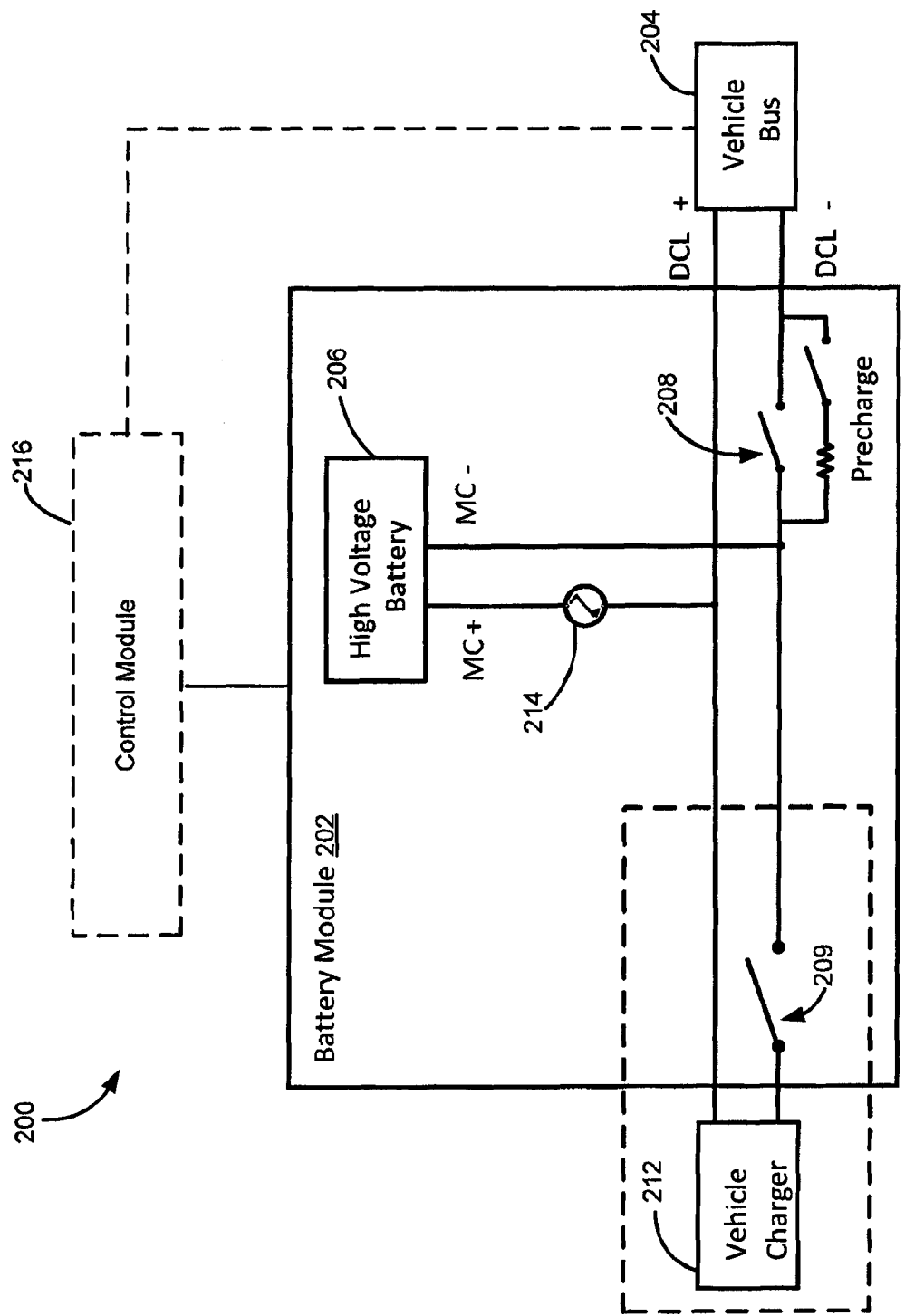
FIG. 2 depicts an example vehicle system according to embodiments.

Referring now to FIG. 2, shown is an exemplary vehicle system 200 according to embodiments. The vehicle system 200 may be implemented on any suitable type of vehicle (not shown), such as an electric vehicle, hybrid electric vehicle (HEV), plug-in electric vehicle (PHEV), or battery electric vehicle (BEV). As illustrated, the vehicle system 200 includes a battery module 202 and a vehicle bus 204 (also referred to herein as an "electrical bus"). Further, the battery module 202 includes a power source for powering the vehicle bus 204, such as, for example, a high voltage battery 206 (also referred to as a "battery pack"). In one embodiment, the high voltage battery 206 provides up to 400 V to the vehicle bus 204. In one example embodiment, the high voltage battery 206 is a traction battery configured to provide power to a motor operating the wheels of the vehicle.

According to embodiments, the vehicle bus 204 is a central electrical network that internally interconnects various components of the vehicle (e.g., engine control unit, transmission control unit, anti-lock braking system, body control modules, wheel control module, various sensors (e.g., temperature, speed, pressure, etc.), etc.). The vehicle bus 204 allows these components to communicate, interact, and exchange data with each other. In some instances, the vehicle bus 204 may also control one or more of the components within the vehicle. In one example embodiment, the vehicle bus 204 is coupled to the motor that operates the wheels of the vehicle.

As shown in FIG. 2, the high voltage battery 206 can have two conductive elements or electrical leads, including a positive lead MC+ and a negative lead MC−, for electrically coupling the battery 206 to, for example, the vehicle bus 204. Likewise, the vehicle bus 204 can have two conductive elements or electrical leads, including a positive lead DCL+ and a negative lead DCL−, for electrically coupling the vehicle bus 204 to, for example, the high voltage battery 206 and/or the vehicle charger 212. As will be appreciated, the negative lead of the high voltage battery 206 may be coupled to the negative lead of the vehicle bus 204 (also referred to herein as a first connection), and the positive lead of the high voltage battery 206 may be coupled to the positive lead of the vehicle bus 204 (also referred to herein as a second connection). As will also be appreciated, breaking either one of the first connection or the second connection may be sufficient to break electrical connection between the high voltage battery 206 and the vehicle bus 204.

As shown in FIG. 2, the battery module 202 further includes a high voltage contactor 208 for selectively coupling the high voltage battery 206 to the vehicle bus 204, and/or a vehicle charger 212 if, for example, the vehicle is a PHEV or BEV. In embodiments, the high voltage contactor 208 may be similar in operation to the contactors 108, 110 discussed above with reference to FIG. 1. Specifically, the contactor 208 may be an electrically controlled switch comprising two or more electrical contacts that can be moved between an open state (or a first switch position) and a closed state (or a second switch position) upon detecting a fault condition. When the contactor 208 is in the open state, the high voltage battery 206 may be electrically disconnected from the vehicle bus 204. And when in the closed state, the contactor 208 may form an electrical connection (also referred to herein as a "first connection") between the high voltage battery 206 and the vehicle bus 204. In the illustrated embodiment, the contactor 208 forms the first connection between the negative lead of the high voltage battery 206 and the negative lead of the vehicle bus 204. In embodiments, the contactor 208 may be specifically configured to connect, and disconnect, high voltage elements within the vehicle system 200. For example, the contactor 208 may include features configured to control and suppress the arc produced when interrupting high voltage currents, such as, e.g., the addition of an air break, a vacuum, or an inert gas.

As also shown in FIG. 2, the battery module 202 further includes a disconnecting device 214 (also referred to herein as a "disconnector") that can be objectively activated or triggered to break electrical connection between the high voltage battery 206 and the vehicle bus 204. In embodiments, the disconnecting device 214 may be considered a secondary disconnection option that is activated only if a primary disconnection option—the contactor 208—fails to open or disconnect the high voltage battery 206. In some embodiments, the disconnecting device 214 includes a pyrotechnic device that ignites or detonates upon activation. The pyrotechnic disconnecting device 214 may be any suitable type of pyrotechnic device that can electrically and physically destroy the second connection, or the current path between the high voltage battery 206 and the vehicle bus 204. The destruction of the second connection may be such that after detonation, the battery module 202 must be repaired, for example, by replacing the pyrotechnic disconnecting device 214 with a new device 214, in order to restore the current path. As such, the pyrotechnic disconnecting device 214 can irrevocably disconnect the high voltage battery 206 from the vehicle bus 204.

As an example, in some embodiments, the pyrotechnic disconnecting device 214 may include a small pyrotechnic charge (not shown) positioned above a mechanical cutter (not shown) that hovers over the positive lead MC+ of the high voltage battery 206. Upon activation of the device 214, the small pyrotechnic charge detonates, which generates an impulse load on top of the mechanical cutter. The impulse load directs the mechanical cutter downwards and into contact with the positive lead MC+, which causes the cutter to cut the positive lead MC+ and thereby, electrically disconnect the high voltage battery 206. As will be appreciated, other types of pyrotechnic disconnecting devices are contemplated and may be utilized to implement the techniques disclosed herein. In some embodiments, the pyrotechnic disconnecting device 214 is substantially similar to a pyrotechnic device included in the vehicle safety device to control airbag inflation.

In other embodiments, the disconnecting device 214 includes a circuit breaker that can interrupt a high voltage current flow upon detecting a fault condition. In one embodiment, the circuit breaker device 214 is a resettable circuit breaker that can be manually or electronically reset after activation, thus possibly minimizing the amount of repair needed after the impact. In one embodiment, the circuit breaker device 214 may detect a fault condition of the vehicle and/or battery module 204 and self-activate in response.

As shown in FIG. 2, the vehicle system 200 further includes a control module 216 (also referred to herein as a "controller") communicatively coupled to the battery module 202 for controlling operation of the contactor 208, the disconnecting device 214, and/or other aspects of the battery module 202. In some embodiments, the control module 216 can be included in a microprocessor for controlling one or more components of the vehicle system 200. According to embodiments, the control module 216 can be configured to receive a fault condition signal that is generated upon detecting a fault condition or other failure within the vehicle. In embodiments, the fault condition signal may be triggered by a vehicular impact (e.g., a collision), the existence of a high voltage short circuit within the vehicle system 200, an intermittent low voltage supply circuit within the vehicle system 200, a fault current caused by normal aging of the vehicle system 200, or any other fault condition that may cause a high voltage presence on the vehicle bus 204.

In some embodiments, the fault condition signal may be generated by an electronic control unit (not shown) of the vehicle that is configured to monitor safety conditions involving the vehicle and/or the vehicle system 200, and is communicatively coupled to the control module 216. For example, in one embodiment, the electronic control unit may be configured to detect a vehicular impact and in response thereto, send the fault condition signal to the control module 216 and activate other vehicle safety features, including, for example, airbag inflation and/or seat belt restraints. In some embodiments, the control module 216 may be included in the above-described electronic control unit. In other embodiments, the control module 216 may be included in the vehicle bus 204 or the battery module 202.

In response to receiving the fault condition signal, the control module 216 can be configured to send an open connection signal to the high voltage contactor 208 to disconnect the high voltage battery 206 from the vehicle bus 204. For example, the open connection signal may command the high voltage contactor 208 to switch to the open state, thereby breaking the first electrical connection between the high voltage battery 206 and the vehicle bus 204. The control module 216 can be further configured to verify whether the contactor 208 has opened in response to the open connection signal. The contactor 208 may fail to open for a number of reasons, including, for example, the contacts within the contactor 208 have welded or bonded together, or the contactor 208 has been mechanically damaged due to a very large vehicular impact. Upon determining that the contactor 208 has failed to open, the control module 216 may generate an activation signal for activating or triggering the disconnecting device 214. For example, the activation signal may cause the disconnecting device 214 to detonate, thereby breaking electrical connection (e.g., the second connection) between the high voltage battery 206 and the vehicle bus 204.

Figure 3:
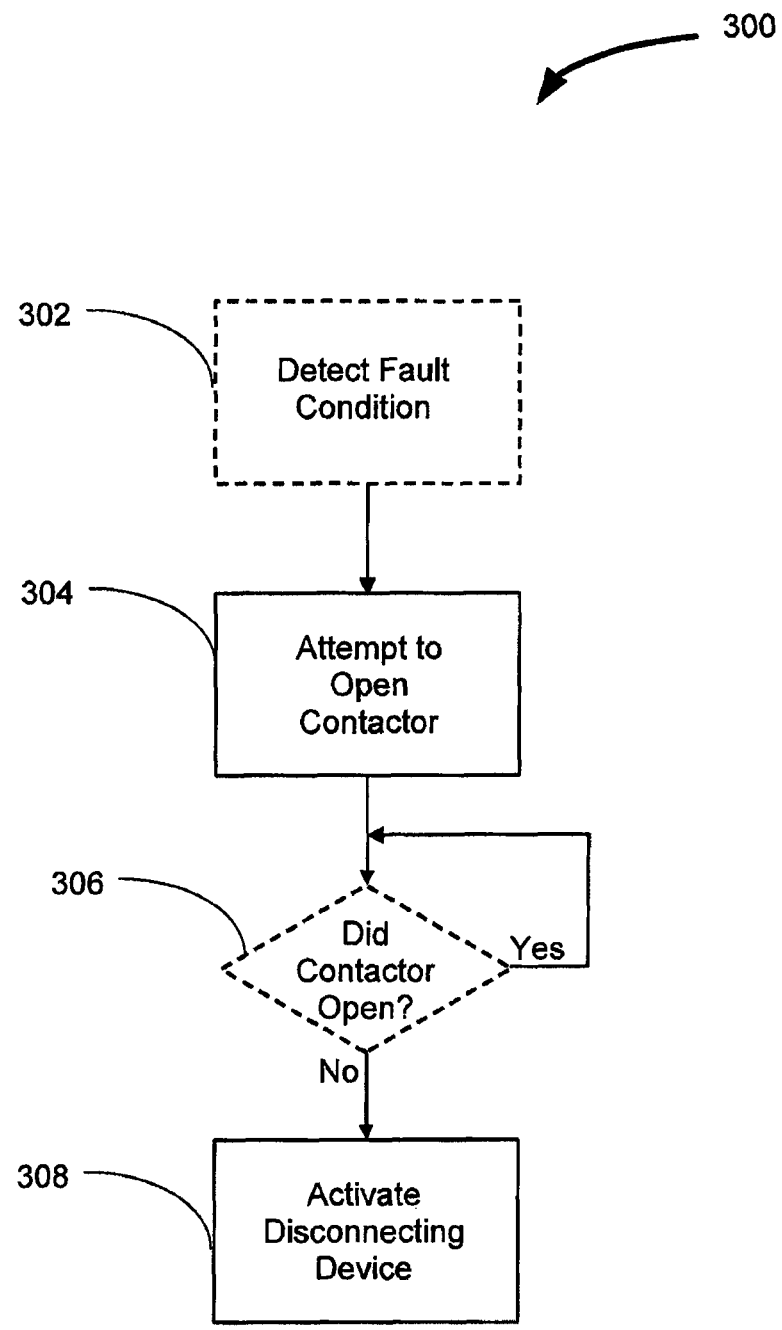
FIG. 3 depicts a flow diagram of an example method utilizing a vehicle system according to embodiments.

FIG. 3 depicts a flow diagram of an example method 300 for electrically disconnecting, within a vehicle system (such as the vehicle system 200), a high voltage power source (such as the battery module 202) from an electrical bus (such as the vehicle bus 204) upon detecting a fault condition. In embodiments, logic for implementing the method 300 can be stored in a memory (not shown) of a control module (such as the control module 216) of the vehicle system.

In some embodiments, the method 300 includes, at block 302, receiving a fault condition signal. In some cases, the fault condition signal may be received in response to detection of a vehicular impact. In other cases, the fault condition signal may be received in response to detection of another fault condition, including, for example, a high voltage short circuit, an intermittent low voltage supply circuit, or a fault current caused by normal aging. According to some embodiments, the fault condition signal may be received by the control module from an electronic control unit that monitors fault conditions within the vehicle, as described above. For example, the electronic control unit may detect a vehicular impact and in response thereto, generate the fault condition signal.

At block 304, when the vehicle is in a fault condition, an attempt to open a contactor (such as the contactor 208) between the battery module and the electrical bus may be made. In some embodiments, upon receiving the fault condition signal, the contactor may be instructed to open a first connection between the electrical bus and the battery module, or more specifically, the high voltage battery included therein. For example, the control module may generate a control signal commanding the contactor to open and may send the control signal to the contactor to electrically disconnect the first connection. As shown in FIG. 2, in embodiments, when in a closed state, the contactor may form the first connection between a negative lead (such as the MC− lead) of the high voltage battery and a negative lead (such as the DCL− lead) of the electrical bus. And when in an open state, the contactor breaks the first connection between the high voltage battery and the electrical bus.

According to some embodiments, the method 300 may include, at block 306, verifying the open state of the contactor. As will be appreciated, a number of techniques may be used to detect the connection status of the contactor. For example, in some embodiments, the control module may determine whether the contactor is in an opened state or a closed state by determining whether there is an electric current between the high voltage battery and the electrical bus, for example, by checking for current flow within the battery module (e.g., at any point between the negative leads MC− and DCL− or at any point between the positive leads MC+ and DCL+) and/or within the electrical bus. If the verification at block 306 is negative, e.g., the contactor did not open, the method 300 continues to block 308. If the verification is positive, e.g., the contactor did open, the method 300 may continue to check whether the contactor remains open, in case the contactor becomes welded after some delay. As will be appreciated, the method 300 may be reset back to step 302, thereby ending the loop at block 306, once the impacted vehicle has been cleared for normal operation and/or repaired and the contactor has been reset to a closed state.

At block 308, responsive to a failed verification at step 306, a disconnecting device (such as the disconnecting device 214) may be activated to break electrical connection between the electrical bus and the battery module, or more specifically the high voltage battery included therein. For example, upon receiving notification that the contactor is still in a closed state, or is not responding to the control signal to open, the control module may generate a control signal to activate the disconnecting device (also referred to herein as "an activation signal"), thereby breaking electrical connection between the electrical bus and the battery module (also referred to herein as a "second connection"). As shown in FIG. 2, in embodiments, the second connection may be formed between a positive lead (such as the MC+ lead) of the high voltage battery and a positive lead (such as the DCL+ lead) of the electrical bus. As mentioned above, in some embodiments, the disconnecting device may include a pyrotechnic device, and activation of the disconnecting device may involve detonating the pyrotechnic device so as to destroy or cut the second connection between the high voltage battery and the electrical bus.

Figure 4:
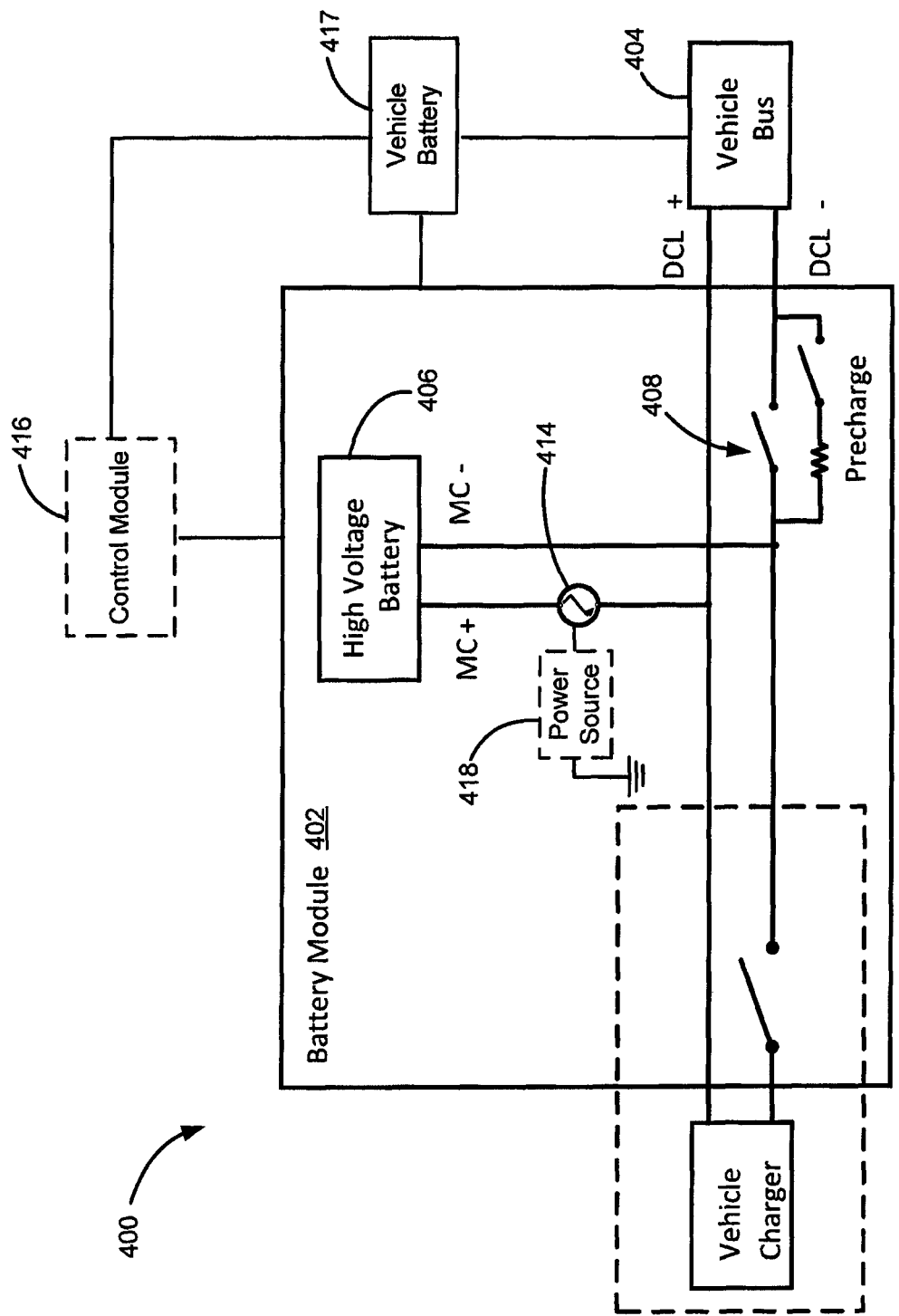
FIG. 4 depicts an example vehicle system according to embodiments.

FIG. 4 depicts an exemplary vehicle system 400 according to embodiments. The vehicle system 400 may be substantially similar to the vehicle system 200 shown in FIG. 2 and discussed above. For example, like the vehicle system 200, the vehicle system 400 provides a secondary disconnection option (e.g., a disconnecting device 414) in case a primary disconnection option (e.g., a contactor 408) fails to disconnect a high voltage battery 406 from a vehicle bus 404 upon detecting a fault condition. More specifically, the vehicle system 400 includes a battery module 402 that is electrically coupled to, and powers, the vehicle bus 404, the battery module 402 including the high voltage battery 406. The battery module 402 further includes the contactor 408 that, when in a closed state, forms a first electrical connection between the high voltage battery 406 and the vehicle bus 404. In embodiments, the vehicle system 400 includes a control module 416 for commanding the contactor 408 to open when a fault condition of the vehicle is detected, so as to electrically disconnect the battery 406 and thereby, prevent a high voltage presence on the vehicle bus 404. Further, the battery module 402 includes the disconnecting device 414 for disrupting a second electrical connection between the high voltage battery 406 and the vehicle bus 404, in the event that the contactor 408 fails to respond to the command from the control module 416. For example, the contactor 408 may fail to open because a fault condition has caused the contactor 408 to weld into a closed state.

FIG. 4 further illustrates components of the vehicle system 400 that can implement activation of the disconnecting device 414. For example, the vehicle system 400 can further include a vehicle battery 417. In embodiments, the vehicle battery 417 is a starting, lighting, ignition (SLI) battery for powering a starter motor, vehicle lights, an ignition system of the vehicle's engine, and other electronics within the vehicle, as indicated by the connection between the vehicle battery 417 and the vehicle bus 404 in FIG. 4. In one embodiment, the vehicle battery 417 is a 12V automotive battery. In some embodiments, the vehicle battery 417 also provides power to the disconnecting device 414, as indicated by the connection between the vehicle battery 417 and the battery module 402 in FIG. 4. For example, upon determining a failure of the primary disconnection option (e.g., the contactor 408), the control module 416 may send a command signal instructing the vehicle battery 417 to activate the disconnecting device 414 (also referred to herein as "an activation signal"). Upon receiving the activation signal, the vehicle battery 417 may activate the disconnecting device 414 by, for example, sending power to the disconnecting device 414. In embodiments, the disconnecting device 414 may require a threshold amount of power to activate and thereby, break the second connection.

In some cases, the fault condition, such as a vehicular impact, may cause the vehicle battery 417 to become electrically disconnected from the disconnecting device 414. Without a threshold amount of power to enable activation, the disconnecting device 414 cannot serve as a secondary disconnection option for ensuring that the high voltage battery 406 is disconnected from the vehicle bus 404. Thus, according to some embodiments, the vehicle system 400 includes a back-up or secondary power source 418 that is electrically coupled to the disconnecting device 414 to provide the threshold amount of power to the disconnecting device 414 in case the vehicle battery 417 becomes disconnected from the device 414. In such embodiments, the control module 416 may be configured to detect a disconnection of the vehicle battery 417 from the disconnecting device 414, and in response thereto, instruct the power source 418 to provide power to the disconnecting device 414, thereby activating the device 414.

According to some embodiments, the power source 418 may be the high voltage battery 406, as the high voltage battery 406 may still be coupled to the disconnecting device 414 prior to activation of the disconnecting device 414. In other embodiments, the power source 418 may be a capacitor charged to capacity and included within the battery module 402. In such embodiments, a size of the capacitor may be selected based on the amount of power required to activate the disconnecting device 414. In one embodiment, the power source 418 may be part of a restraint control module (RCM) (not shown), which includes an RCM capacitor for activating a vehicle safety device, such as an airbag, upon detection of a collision. For example, the power source 418 may be the RCM capacitor, and the RCM capacitor may be sufficiently sized to power both the disconnecting device 414 and the vehicle safety device. In yet another embodiment, the power source 418 may be a back-up battery, separate from the high voltage battery 406 and the vehicle battery 417. As will be appreciated from above, the power source 418 is shown in the dashed lines in FIG. 4 because in some embodiments, the power source 418 may not be included within the battery module 402.

Thus, the application describes systems and methods providing a two-step high voltage cutoff technique that disconnects a high voltage battery from a vehicle bus upon detecting a fault condition, thereby potentially reducing the possibility of having a high voltage presence on the vehicle bus. Example embodiments include first attempting to mechanically disconnect the high voltage battery by opening an electronically controlled contactor coupled between the battery and the vehicle bus, and if the contactor fails to open, irrevocably disconnecting the high voltage battery by, for example, detonating a pyrotechnic device coupled between the battery and the vehicle bus. As will be appreciated, the systems and methods disclosed herein provide several advantages over conventional high voltage cutoff techniques. For example, the two-step high voltage cutoff technique described herein can advantageously outperform conventional high voltage cutoff systems, particularly in scenarios where both contactors in a dual-contactor system become welded after an impact or other fault condition.

As another example, the disclosed systems and methods may reduce the cost of a high voltage cutoff system (e.g., as compared to conventional dual-contactor systems) by requiring only one high voltage contactor. In example embodiments, costs may be further reduced by including a pyrotechnic disconnecting device that is commonly available and therefore, less expensive than a high voltage contactor. As yet another example, the disclosed systems and methods may reduce the footprint of the battery module by including only one high voltage contactor. In example embodiments, this footprint may be further reduced by including a pyrotechnic disconnecting device that is relatively lighter and smaller in size (e.g., approximately one inch wide by one inch long by one inch deep) than the contactor. Further, in example embodiments, the disclosed techniques provide a high voltage cutoff system that may be easier, and therefore less costly, to repair (e.g., as compared to a conventional dual-contactor system) at least because replacing a pyrotechnic device may require fewer labor hours and parts than replacing a welded contactor.

Any process descriptions or blocks in the figures, such as FIG. 3, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle system, comprising:
   an electrical bus;
   a battery module coupled to the electrical bus via a contactor and a disconnector; and
   a controller configured to:
   switch the contactor to an open state, upon receiving a fault condition signal, and
   if the contactor failed to open, activate the disconnector to break electrical connection between the battery module and the electrical bus.

2. The vehicle system of claim 1, wherein the battery module includes a high voltage battery for providing power to the electrical bus;
   the vehicle system further comprising:
   a vehicle battery coupled to the controller and the disconnector, the vehicle battery being configured to provide a required power for activating the disconnector;
   a power source coupled to the disconnector to provide the required power if the vehicle battery is disconnected from the disconnector;
   wherein the power source is a charged capacitor.

3. The vehicle system of claim 1, wherein the battery module includes a high voltage battery for providing power to the electrical bus;
   the vehicle system further comprising:
   a vehicle battery coupled to the controller and the disconnector, the vehicle battery being configured to provide a required power for activating the disconnector;
   a power source coupled to the disconnector to provide the required power if the vehicle battery is disconnected from the disconnector;
   wherein the power source is the high voltage battery.

4. A method for disconnecting a battery module from an electrical bus in a vehicle, comprising:
   attempting to open a contactor between the battery module and the electrical bus when the vehicle is in a fault condition; and
   if the contactor does not open, activating a disconnector to break electrical connection between the battery module and the electrical bus.

5. The method of claim 4, wherein the battery module includes a high voltage battery for providing power to the electrical bus;
   wherein activating the disconnector includes instructing a vehicle battery to provide power to the disconnector;
   wherein activating the disconnector further includes if the vehicle battery is disconnected from the disconnector, instructing a power source to provide power to the disconnector;
   wherein the power source is a charged capacitor.

6. The method of claim 4, wherein the battery module includes a high voltage battery for providing power to the electrical bus;
   wherein activating the disconnector includes instructing a vehicle battery to provide power to the disconnector;
   wherein activating the disconnector further includes if the vehicle battery is disconnected from the disconnector, instructing a power source to provide power to the disconnector;
   wherein the power source is the high voltage battery.

7. The vehicle system of claim 1, wherein the disconnector comprises:
   a portion of a wire connecting the battery module to the vehicle bus; and
   a pyrotechnic device configured to destroy the portion of the wire connecting the battery module to the vehicle bus.

8. A system, comprising:
   a battery module configured to couple to an electrical bus via a contactor; and a controller configured to:
- switch the contactor to an open state, upon receiving a fault condition signal,
- if the contactor failed to open, activate a disconnector to break electrical connection between the battery module and the electrical bus.

9. The system of claim 8, wherein the disconnector comprises a pyrotechnic device.

10. The system of claim 9, wherein the controller is configured to determine whether the contactor switched to the open state, and based on the determination, detonate the pyrotechnic device.

11. The system of claim 9, wherein the controller is configured to only detonate the pyrotechnic device upon determining that the contactor failed to open.

12. The system of claim 11, wherein the battery module comprises a high voltage battery and the contactor is configured to electrically link the high voltage battery to the electrical bus.

13. The system of claim 9, wherein the battery module comprises a battery with a positive lead and a negative lead and the pyrotechnic device is configured to break the positive, but not the negative lead.

14. The system of claim 8, wherein the controller is configured to (a) switch the contactor to the open state by instructing the contactor to switch to the open state, and (b) thereafter, determine whether the contactor actually switched to the open state.

15. The system of claim 9, wherein the battery module comprises a first battery and the system comprises a second battery, wherein the controller is configured to command both of the first battery and the second battery to detonate the pyrotechnic device.

16. The system of claim 15, wherein the controller is configured to determine whether the second battery is connected to the pyrotechnic device and based on the determination, command the first battery to detonate the pyrotechnic device.

17. The system of claim 15, wherein the controller is configured to only command the first battery to detonate the pyrotechnic device upon determining that the second battery is disconnected from the pyrotechnic device.

18. The system of claim 16, wherein the first battery is a high voltage battery and the second battery is a twelve-volt battery.

19. The system of claim 9, wherein the battery module comprises a battery and the system comprises a capacitor, wherein the controller is configured to command both of the battery and the capacitor to denote the pyrotechnic device.

20. The system of claim 19, wherein the controller is configured to only command the capacitor to detonate the pyrotechnic device upon determining that the battery is disconnected from the pyrotechnic device.

* * * * *